(12) United States Patent
Bennett

(10) Patent No.: US 10,364,874 B1
(45) Date of Patent: *Jul. 30, 2019

(54) TRANSMISSION AND ENGINE CONFIGURATION

(71) Applicant: Hydro-Gear Limited Partnership, Sullivan, IL (US)

(72) Inventor: Michael L. Bennett, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 55 days.

This patent is subject to a terminal disclaimer.

(21) Appl. No.: 15/670,510

(22) Filed: Aug. 7, 2017

Related U.S. Application Data

(63) Continuation of application No. 14/589,063, filed on Jan. 5, 2015, now Pat. No. 9,726,269, which is a continuation of application No. 12/843,161, filed on Jul. 26, 2010, now Pat. No. 8,925,311.

(60) Provisional application No. 61/228,397, filed on Jul. 24, 2009.

(51) Int. Cl.
| | |
|---|---|
| *B60K 17/10* | (2006.01) |
| *F16H 47/02* | (2006.01) |
| *F16H 39/14* | (2006.01) |
| *F04B 23/04* | (2006.01) |
| *F16H 57/02* | (2012.01) |

(52) U.S. Cl.
CPC .............. *F16H 47/02* (2013.01); *F04B 23/04* (2013.01); *B60K 17/10* (2013.01); *F16H 39/14* (2013.01); *F16H 2047/025* (2013.01); *F16H 2057/02043* (2013.01)

(58) Field of Classification Search
CPC ........ B60K 17/14; B60K 7/0015; B60K 7/10; B60K 7/105; F16H 47/02; F16H 2047/025; F16H 39/08; F16H 39/14
See application file for complete search history.

(56) References Cited

U.S. PATENT DOCUMENTS

| | | | |
|---|---|---|---|
| 1,846,360 | A | 2/1932 | Rudolph |
| 1,942,064 | A | 1/1934 | Leveen |
| 3,052,098 | A | 11/1960 | Ebert |
| 3,122,944 | A | 3/1964 | Boehner et al. |
| 3,123,975 | A | 3/1964 | Ebert |
| 3,212,358 | A | 10/1965 | de Lalio |
| 3,255,589 | A | 6/1966 | Ebert |

(Continued)

FOREIGN PATENT DOCUMENTS

| | | |
|---|---|---|
| CA | 2465628 | 8/2001 |
| EP | 0857264 | 4/2002 |

(Continued)

*Primary Examiner* — Michael Leslie
*Assistant Examiner* — Michael Quandt
(74) *Attorney, Agent, or Firm* — Neal, Gerber & Eisenberg LLP

(57) ABSTRACT

A drive train configuration is disclosed. The drive train incorporates an engine having hydraulic pumps contained substantially inside the engine housing and with an engine shaft driving the hydraulic pumps. A porting block or center section is mounted to the engine housing to provide hydraulic communication between the hydraulic pumps located inside the engine housing and hydraulic motors located outside the engine housing. The hydraulic motor output shafts drive gears connected to axles to propel a vehicle.

20 Claims, 14 Drawing Sheets

(56) References Cited

U.S. PATENT DOCUMENTS

| | | |
|---|---|---|
| 3,279,172 A | 10/1966 | Kudo et al. |
| 3,300,698 A | 1/1967 | Bopp et al. |
| 3,309,943 A | 3/1967 | Kosman et al. |
| 3,748,851 A | 7/1973 | Hause |
| 3,775,981 A | 12/1973 | Molly |
| 3,854,160 A * | 12/1974 | Hildebrand ............... E01H 1/04 15/84 |
| 3,864,916 A | 2/1975 | Maistrelli et al. |
| 4,132,278 A | 1/1979 | Todeschini |
| 4,289,456 A | 9/1981 | Ishihara |
| 4,574,902 A | 3/1986 | Irimajiri |
| 4,676,065 A | 6/1987 | Eberhardt |
| 4,698,975 A | 10/1987 | Tsukamoto et al. |
| 4,738,328 A | 4/1988 | Hayden |
| 4,809,796 A | 3/1989 | Yamaoka et al. |
| 4,819,508 A | 4/1989 | Yamaoka et al. |
| 4,893,524 A | 1/1990 | Ohashi et al. |
| 4,969,319 A | 11/1990 | Hutchinson et al. |
| 5,031,591 A | 7/1991 | Shinoda et al. |
| 5,067,933 A | 11/1991 | Hardesty et al. |
| 5,069,037 A | 12/1991 | Sakigawa et al. |
| 5,078,222 A | 1/1992 | Hauser et al. |
| 5,085,053 A | 2/1992 | Hayashi et al. |
| 5,277,270 A | 1/1994 | Hasegawa |
| 5,314,387 A | 5/1994 | Hauser et al. |
| 5,458,100 A | 10/1995 | Neuenfeld |
| 5,494,414 A | 2/1996 | Steinhart et al. |
| 5,542,307 A | 8/1996 | Hasegawa et al. |
| 5,546,901 A | 8/1996 | Acker et al. |
| 5,653,584 A | 8/1997 | Mazzucato et al. |
| 5,823,752 A | 10/1998 | Hoenisch et al. |
| 5,951,425 A | 9/1999 | Iida et al. |
| 6,122,996 A | 9/2000 | Hauser et al. |
| 6,152,247 A | 11/2000 | Sporrer et al. |
| 6,253,637 B1 | 7/2001 | Hauser et al. |
| 6,286,475 B1 | 9/2001 | Pierro |
| 6,324,843 B1 | 12/2001 | Yasuda et al. |
| 6,357,413 B1 | 3/2002 | Ito et al. |
| 6,385,971 B1 | 5/2002 | Abend et al. |
| 6,474,218 B2 | 11/2002 | Saito et al. |
| 6,508,222 B2 | 1/2003 | Takano |
| 6,524,203 B2 | 2/2003 | Kawamoto et al. |
| 6,530,200 B1 | 3/2003 | Minoura et al. |
| 6,530,218 B2 | 3/2003 | Saito et al. |
| 6,578,656 B2 | 6/2003 | Samejima et al. |
| 6,626,140 B2 | 9/2003 | Aichinger et al. |
| 6,644,262 B2 | 11/2003 | Matsuda et al. |
| 6,672,058 B1 | 1/2004 | Langenfeld et al. |
| 6,675,696 B1 | 1/2004 | Langenfeld |
| 6,698,199 B2 | 3/2004 | Hayashi et al. |
| 6,758,290 B2 | 7/2004 | Jolliff et al. |
| 6,779,615 B2 | 8/2004 | Boyer et al. |
| 6,799,485 B1 | 10/2004 | Kawamoto et al. |
| 6,820,403 B2 | 11/2004 | Umemoto |
| 6,843,056 B1 | 1/2005 | Langenfeld et al. |
| 6,877,580 B2 | 4/2005 | Hasegawa et al. |
| 6,889,651 B2 | 5/2005 | Tanaka et al. |
| 6,904,889 B2 | 6/2005 | Matsuda et al. |
| 6,907,729 B1 | 6/2005 | Okada et al. |
| 6,973,783 B1 * | 12/2005 | Hauser ................... F04B 1/324 60/484 |
| 6,996,981 B2 | 2/2006 | Ito et al. |
| 7,000,388 B2 | 2/2006 | Saitou et al. |
| 7,040,454 B2 | 5/2006 | Kawamoto et al. |
| 7,051,840 B2 | 5/2006 | Tani |
| 7,062,909 B2 | 6/2006 | Ito et al. |
| 7,162,871 B2 | 1/2007 | Nozaki |
| 7,163,077 B2 | 1/2007 | Hasegawa et al. |
| 7,188,697 B2 | 3/2007 | Ito et al. |
| 7,219,646 B2 | 5/2007 | Ueshima |
| 7,220,204 B2 | 5/2007 | Okada et al. |
| 7,240,657 B2 | 7/2007 | Watanabe |
| 7,325,527 B2 | 2/2008 | Hochmayr et al. |
| 7,374,010 B2 | 5/2008 | Hasegawa et al. |
| 7,431,123 B2 | 10/2008 | Irikura et al. |
| 7,455,132 B2 | 11/2008 | Acharya et al. |
| 7,614,227 B2 | 11/2009 | Carlson et al. |
| 7,658,128 B2 | 2/2010 | Sugano |
| 7,690,198 B2 | 4/2010 | Rousseau et al. |
| 7,707,829 B2 | 5/2010 | Dvorak et al. |
| 7,739,870 B2 | 6/2010 | Carlson et al. |
| 7,762,371 B2 | 7/2010 | Kawamura et al. |
| 8,056,333 B1 | 11/2011 | Bennett et al. |
| 8,112,991 B1 * | 2/2012 | Iida ...................... B60K 17/105 60/487 |
| 8,468,819 B1 | 6/2013 | Bennett et al. |
| 8,635,867 B2 | 1/2014 | Dong et al. |
| 9,726,269 B1 * | 8/2017 | Bennett ................ B60K 7/0015 |
| 2002/0189885 A1 | 12/2002 | Ruebusch et al. |
| 2007/0209456 A1 | 9/2007 | Irikura et al. |
| 2007/0209457 A1 | 9/2007 | Irikura et al. |

FOREIGN PATENT DOCUMENTS

| | | |
|---|---|---|
| WO | WO2011054333 | 5/2011 |
| WO | WO2012169663 | 12/2012 |

* cited by examiner

US 10,364,874 B1

TRANSMISSION AND ENGINE CONFIGURATION

CROSS REFERENCE

This application is a continuation of U.S. patent application Ser. No. 14/589,063 filed on Jan. 5, 2015, which is a continuation of U.S. patent application Ser. No. 12/843,161 filed on Jul. 26, 2010, now U.S. Pat. No. 8,925,311, which claims the benefit of U.S. Provisional Patent Application No. 61/228,397 filed on Jul. 24, 2009. The contents of each of these prior applications are incorporated by reference in their entirety.

BACKGROUND

This application relates to drive train configurations; in particular, drive train configurations that include a prime mover or engine and a transmission or transaxle assembly.

SUMMARY

An integrated engine and transmission drive train assembly is disclosed herein. This assembly may be used in connection with various applications, including, e.g., a zero turn ("ZT") vehicle. A better understanding of the invention will be obtained from the following detailed descriptions and accompanying drawings, which set forth one or more illustrative embodiments that are indicative of the various ways in which the principals of the invention may be employed.

DETAILED DESCRIPTION OF THE DRAWINGS

Figure 1:
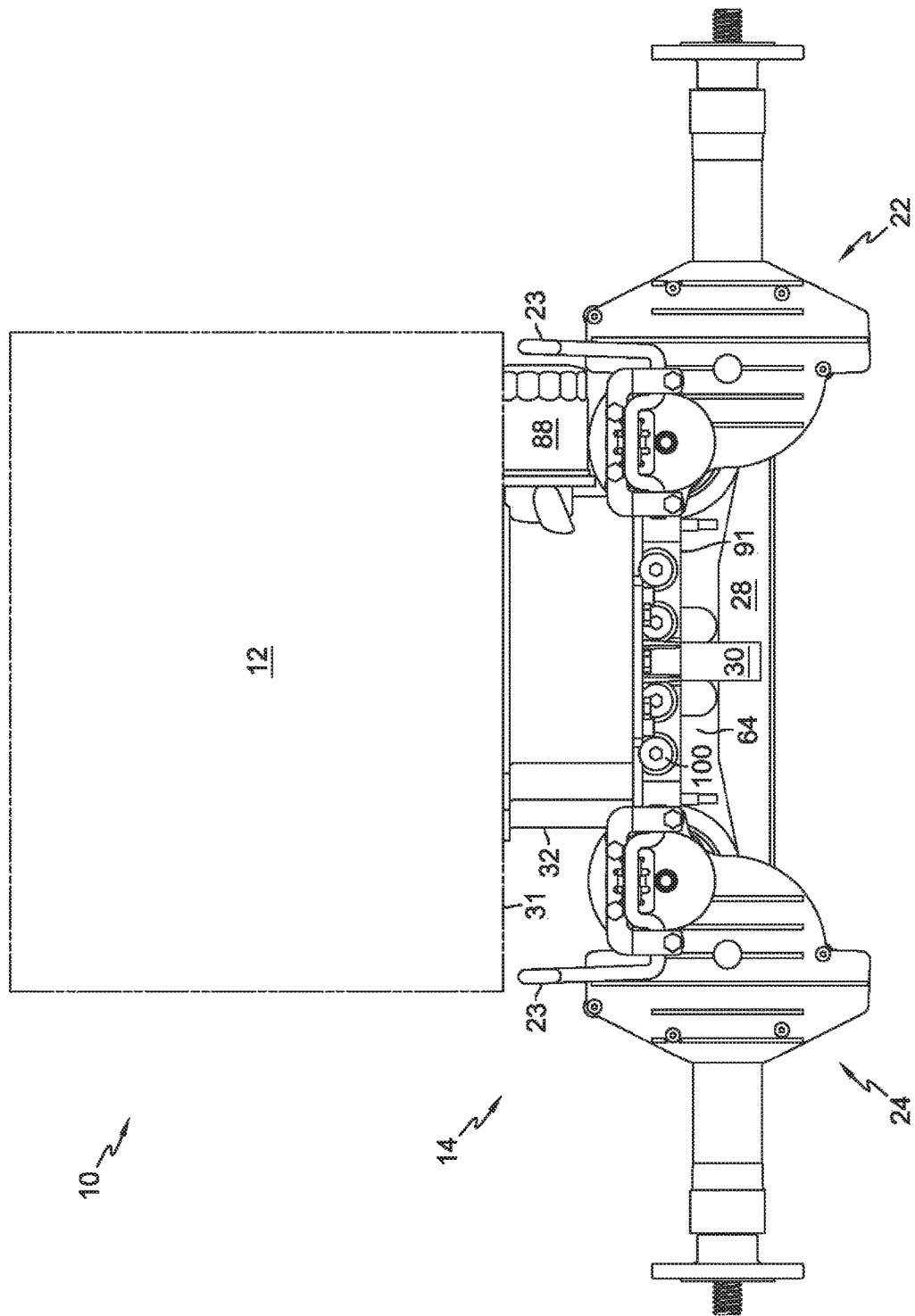
FIG. 1 is an elevational view of a first embodiment of the present invention.

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

A first embodiment of the present invention is illustrated in FIGS. 1-12. In the depicted embodiment, two independently controlled, variable speed hydraulic pumps 40 and 42 each drive a fixed displacement hydraulic motor 16 and 18, respectively, to enable zero turn radius capability on a ZT vehicle.

As described in detail below, center section 64 is mounted to the bottom of housing 32 to close opening 33 in housing 32. As such, center section 64 functions as a portion of lower housing 32, sealing off sump 13, which sump is common to the hydrostatic system and engine assembly 12. Hydraulic pumps 40 and 42 are substantially located inside lower housing 32, while motors 16 and 18 are external to housing 32. Both hydraulic pumps 40 and 42 and motors 16 and 18 are rotatably disposed on center section 64.

Drive train assembly 10, illustrated in FIG. 1, comprises a prime mover in the form of an engine assembly 12, which is engaged to transaxle assembly 14. A prime mover output shaft, such as, for example, crankshaft 30 extending through lower housing 32, is drivingly engaged to hydraulic pumps 40 and 42, as described in detail below. Additionally, crankshaft 30 may drive multiple other assemblies, such as a power take-off device (PTO) that may be electrically or hydraulically actuated and drivingly connect engine assembly 12 to auxiliary equipment, such as, for example, a mowing deck or mowing deck lift of a lawn tractor, by means of a belt and pulley system. Optionally, crankshaft 30 may drive an additional pump to hydraulically drive auxiliary equipment such as a mowing deck, or an electrical power generating device, such as an alternator, in order to charge batteries that power electric motors to drive, for example, the blades of a mowing deck.

Figure 3:
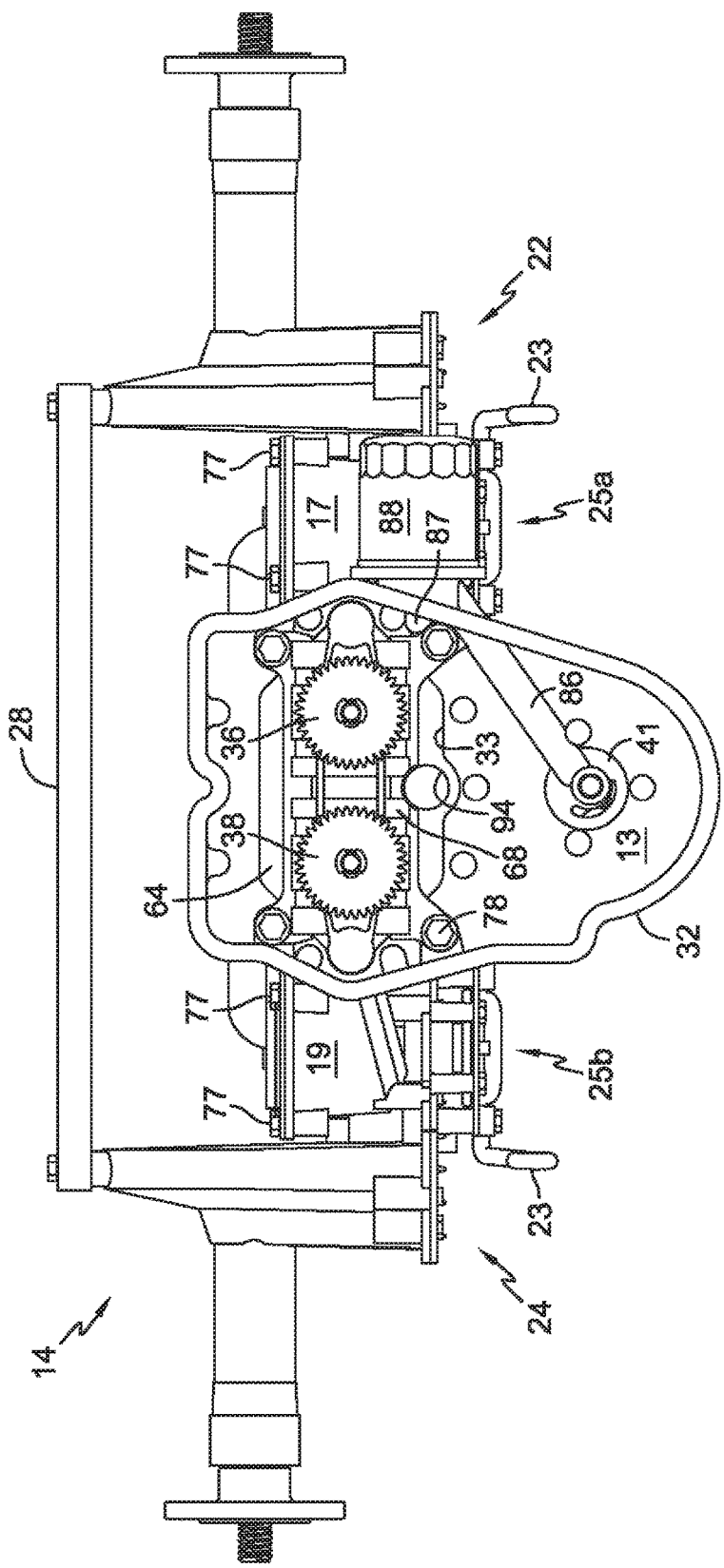
FIG. 3 is a plan view of the transaxle assembly shown in FIG. 1 with certain components removed for clarity.
Figure 4:
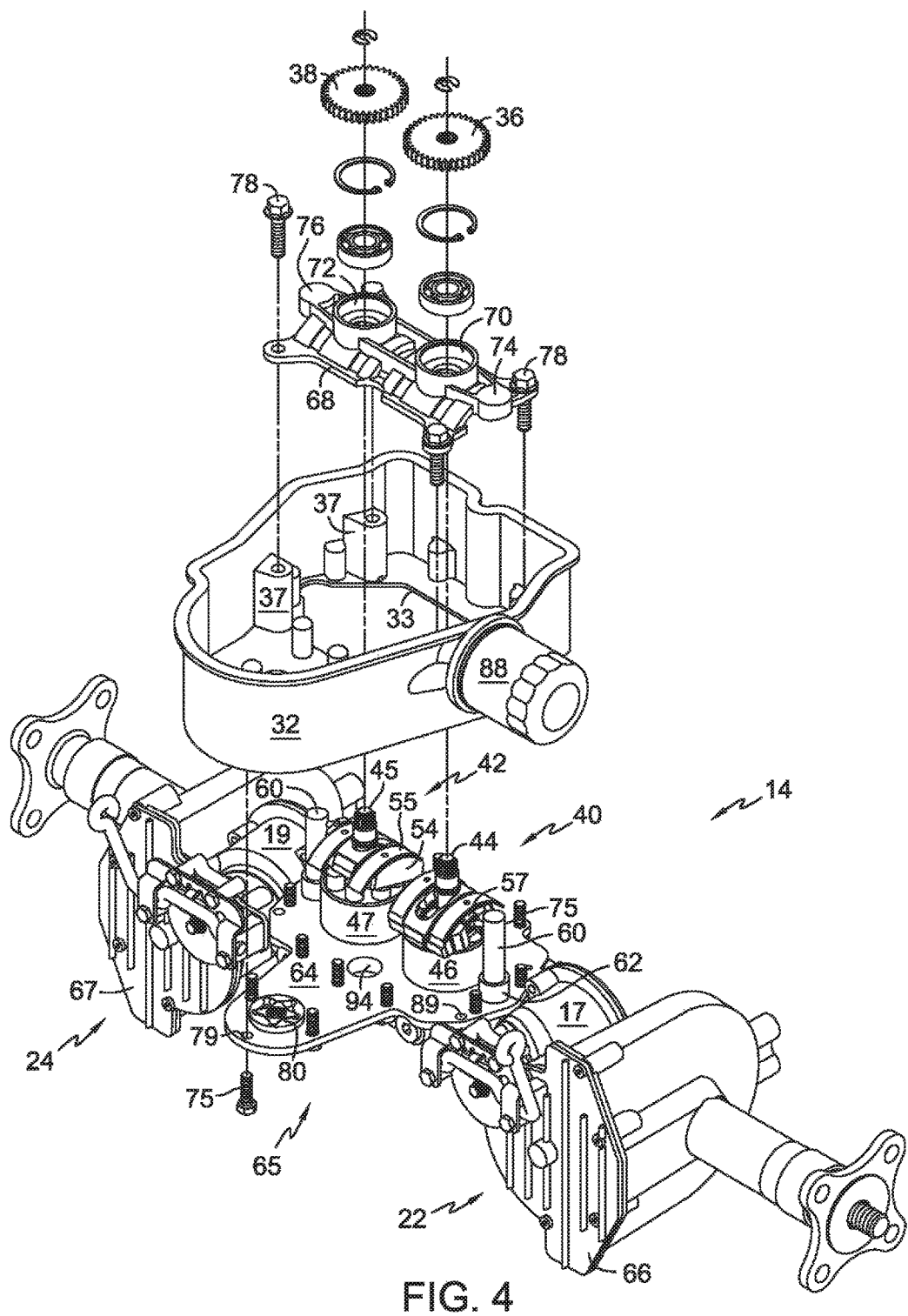
FIG. 4 is an exploded perspective view of the configuration shown in FIG. 1.

Engine assembly 12 comprises an upper engine housing 31 and a lower engine housing 32. As shown in FIGS. 3 and 4, opening 33 is provided in lower engine housing 32 for insertion of a first hydraulic pump assembly 40 and a second hydraulic pump assembly 42, both of which are supported by center section 64. Bridge plate 68 is attached via fasteners 78 to bridge supports 37 of lower engine housing 32. Transaxle assembly 14 is attached to lower engine housing 32, thereby capturing and supporting pump assemblies 40 and 42 between center section 64 and bridge plate 68. Bridge plate 68 also retains cradle bearings 55 and swash plate assemblies 54. Although cradle bearings 55 are captured, retained, or restrained by features formed in bridge plate 68, these bearings are shown in contact with swash plate assemblies 54 in FIG. 4 to illustrate form and show position with respect to swash plate assemblies 54.

Figure 2:
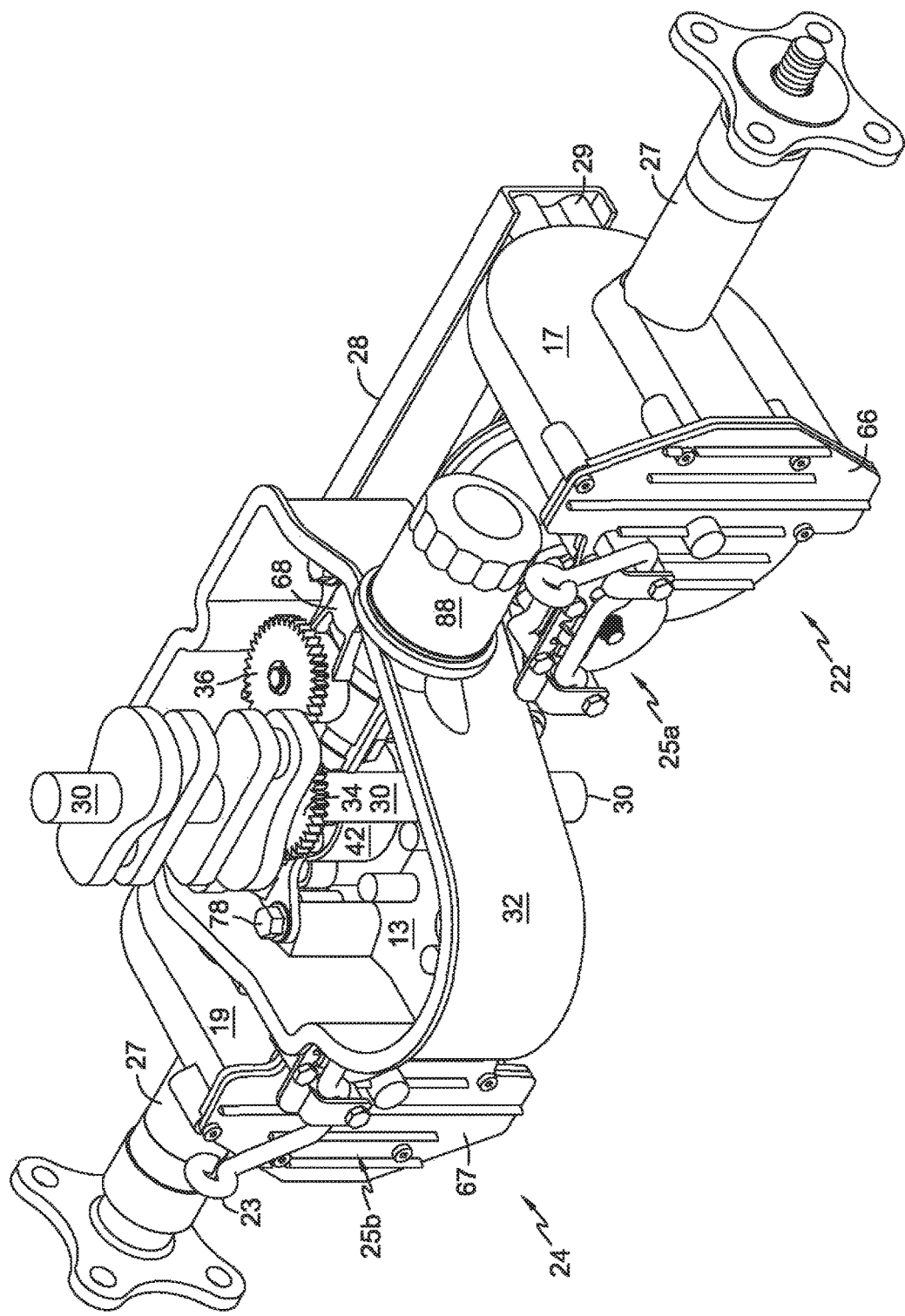
FIG. 2 is a perspective view of the transaxle assembly and certain elements of the engine assembly of the embodiment shown in FIG. 1.

Brace 28, seen in, e.g., FIG. 2, attached to brace attachment features 29 of motor housings 17 and 19, may be used to structurally reinforce transaxle assembly 14 and drive train assembly 10 to avoid flexing of the vehicle frame that could damage components of the drive train. Optionally, brace 28 may be a crossmember of a utility vehicle frame structure. Additional mounting features and/or components (not shown) may also be added to center section 64 and/or housing components of transaxle assembly 14 or engine 12, as needed, to help secure transaxle assembly 14 to engine assembly 12 and/or to a vehicle frame structure (not shown). For example, u-bolts may be used to secure the axle support portions 27 of motor housings 17 and 19 of transaxle assembly 14 to a vehicle frame. Optionally, integral mounting structures with mounting holes for fasteners may be added to motor housings 17 and 19 to help secure drive train assembly 10 to a vehicle frame.

In the embodiment depicted, the complete, or substantially complete, drive train of a ZT vehicle, comprising engine, pumps, motors, reduction gears and axles, can be preassembled before attachment to a vehicle frame, without the need for hydraulic hoses and fittings and/or belts and pulleys associated with current ZT vehicle drive configurations.

Referring to FIGS. 1-4, crankshaft 30 is driven by elements of engine assembly 12 that are not shown, but known by those in the art. Crankshaft 30 extends through opening 33 in lower engine housing 32 and may be supported by crankshaft support boss 94 in center section 64. Crankshaft 30 has a gear 34 mounted thereon that drives gears 36 and 38. Gear 36 is mounted on first pump input shaft 44, which drives first pump 40. Gear 38, in turn, is mounted on second pump input shaft 45, which drives second pump 42. Other suitable gear trains or mechanisms that drivingly engage crankshaft 30 with hydraulic pumps 40 and 42 are within the scope of the invention.

As described in detail below, a swash plate control shaft 60 is engaged to each hydraulic pump 40 and 42 to independently control the output thereof. The rotation of control shafts 60 and the resulting control of pumps 40 and 42 may be accomplished electrically, hydraulically, or by mechanical linkage to manual operator controls.

Figure 5:
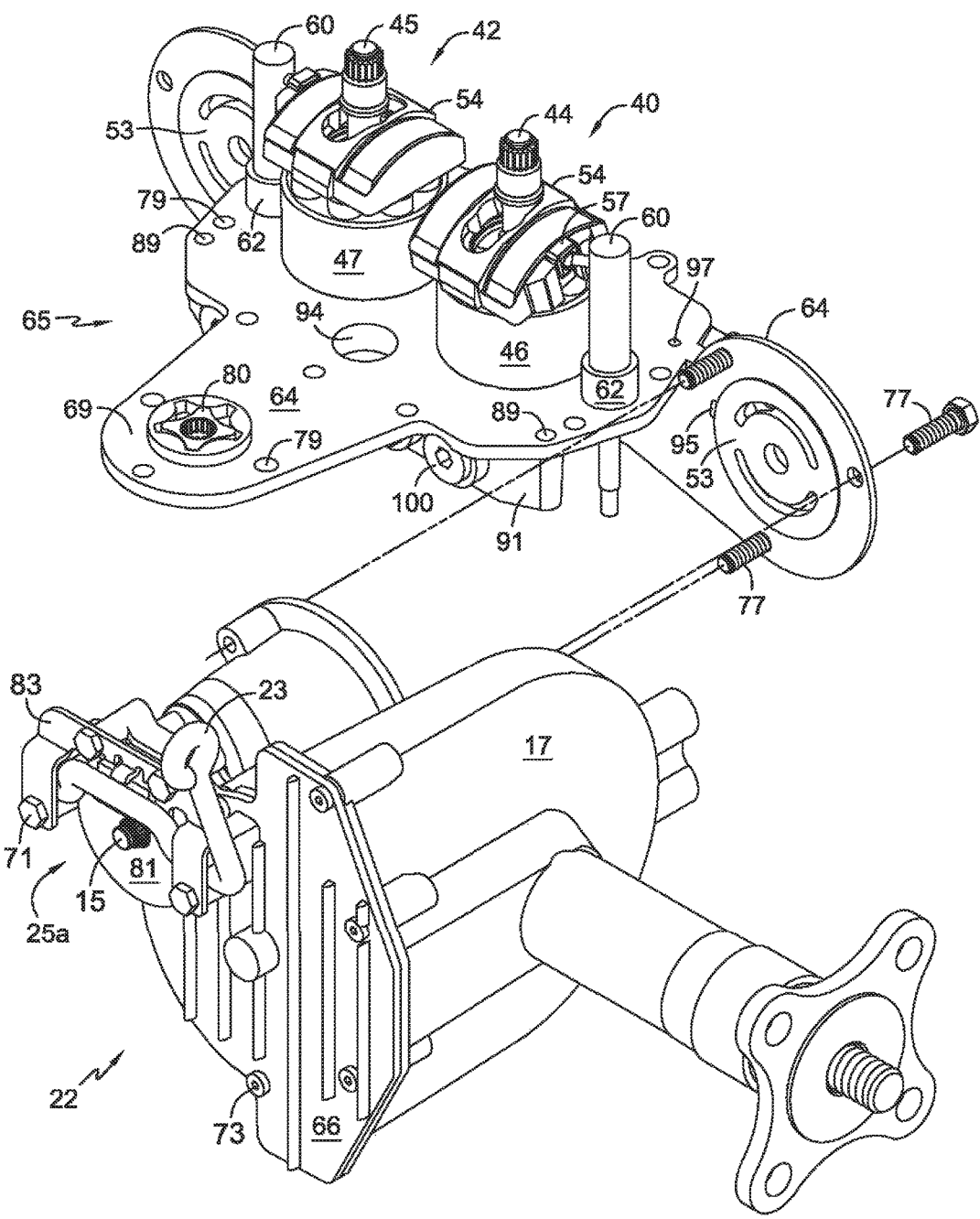
FIG. 5 is an exploded perspective view of the pump module and one of the motor modules shown in FIG. 1.
Figure 6:
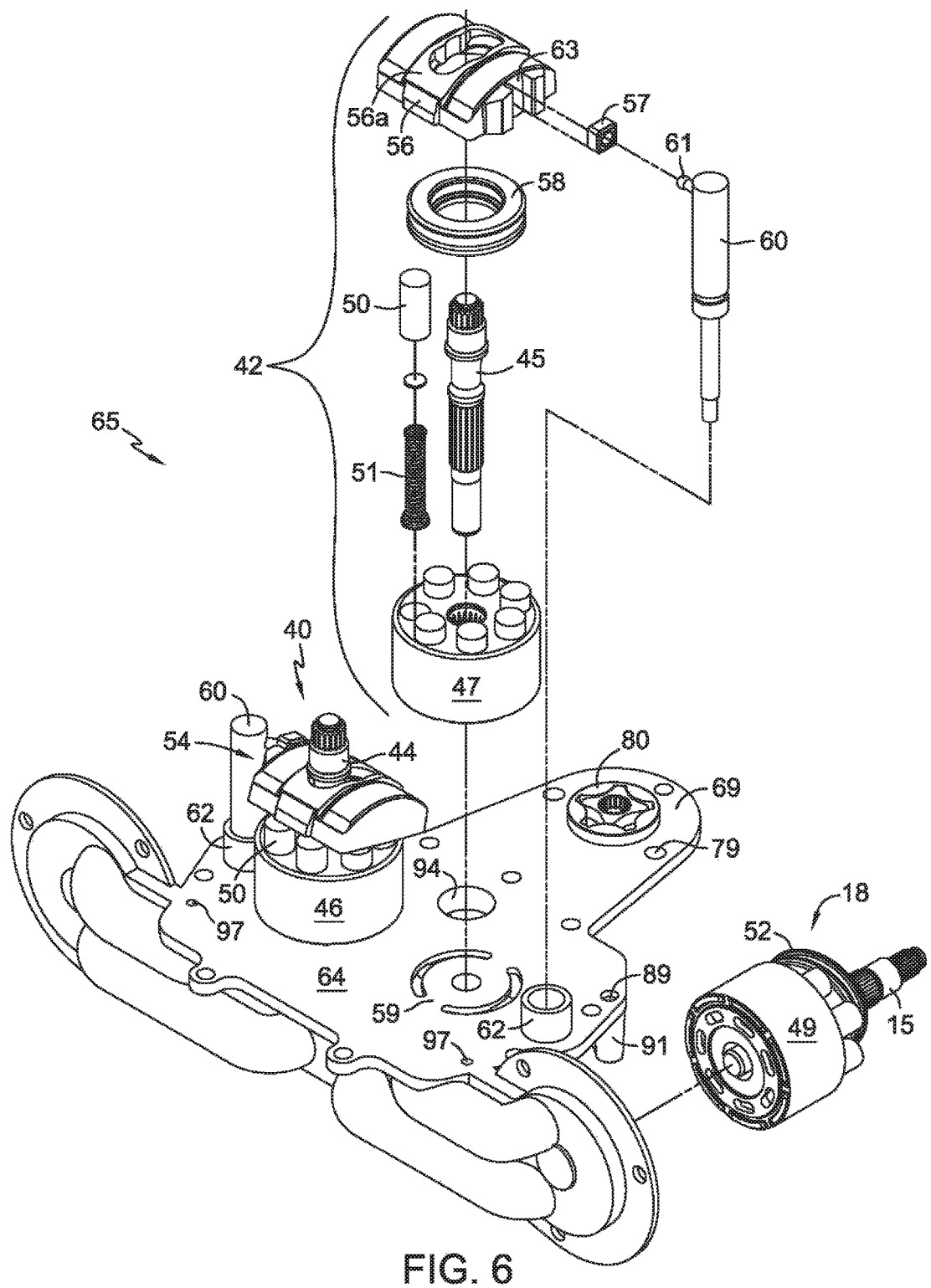
FIG. 6 is an exploded perspective view of the pump module shown in FIG. 1 and one of the basic motor assemblies.

As shown most clearly in FIG. 6, the first pump 40 and the second pump 42 are axial piston pumps. As axial piston pumps are well-known in the art, only a minimal explanation of these devices is provided herein. A more detailed explanation of such axial piston pumps, as well as hydraulic motors as described below, may be found in commonly assigned U.S. Pat. Nos. 5,314,387, 6,122,996 and 6,675,696, the contents of each of which are hereby incorporated herein by reference. Additionally, while pumps 40 and 42 are depicted in FIGS. 5 and 6 as axial piston pumps, it will be obvious to those in the art that the scope of the present invention is not limited to axial piston pumps, nor is it limited to embodiments in which pumps 40 and 42 are identical.

First pump input shaft 44 drives a first pump cylinder block 46, which comprises a plurality of pistons 50, associated piston springs 51, and other elements appropriate to an axial piston pump. Similarly, second pump input shaft 45 drives second pump cylinder block 47. The pistons 50 of each cylinder block interact with their associated swash plate assembly 54. Both swash plate assemblies 54 may each comprise a swash plate body 56 and a thrust bearing 58.

Cylinder blocks 46 and 47 are rotatably disposed on pump running surfaces 59 of center section 64. Cylinder blocks 46 and 47 may be directly disposed on running surfaces 59, or they may be disposed on a separate pump running surface element supported on center section 64, such as a valve plate (not shown).

Figure 7:
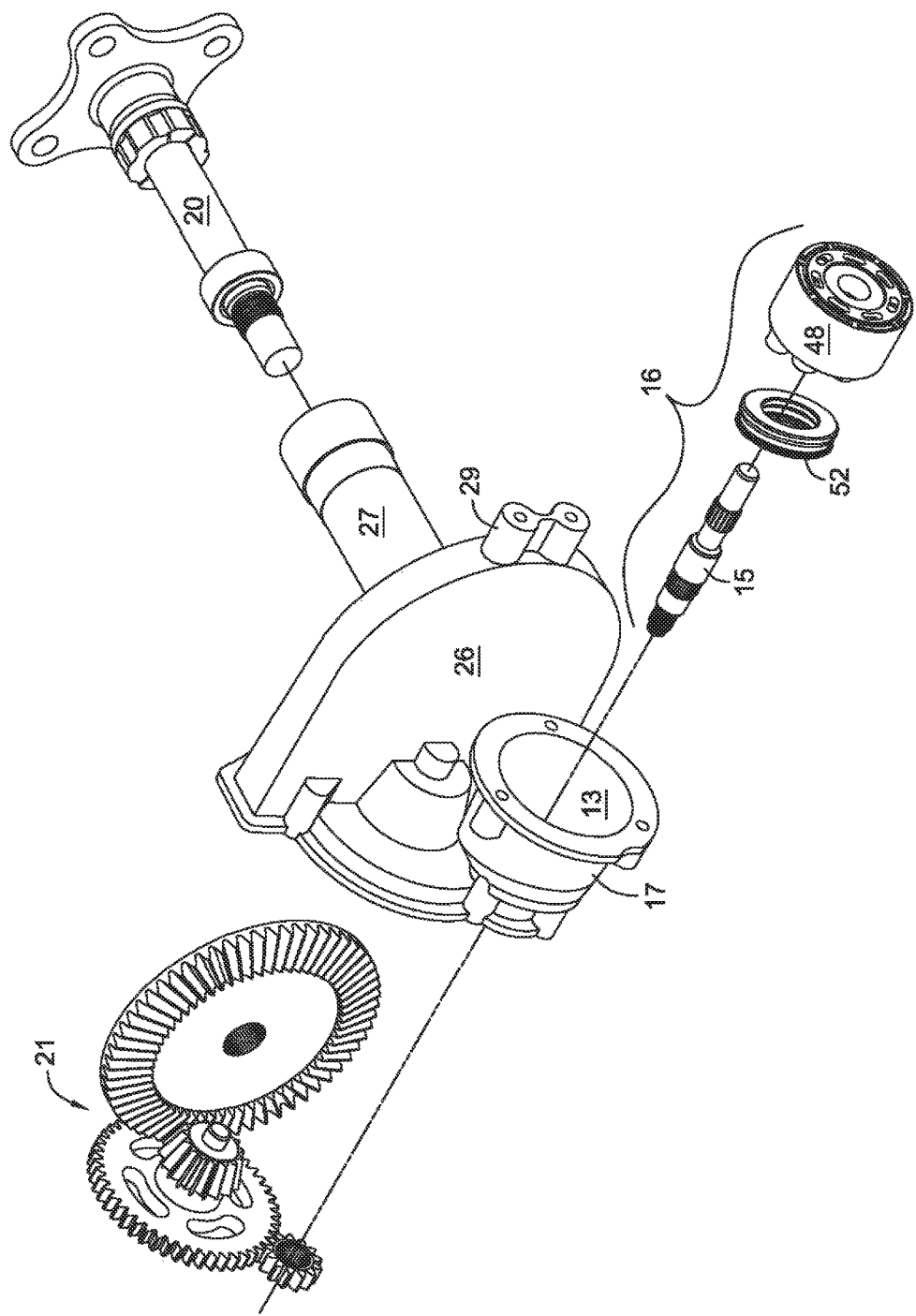
FIG. 7 is an exploded bottom perspective view of the motor module shown in FIG. 1 without the housing cover and brake assembly.

Referring now to FIGS. 4-7, a first hydraulic motor assembly 16 and a second hydraulic motor assembly 18 are partially supported by first motor housing 17 and second motor housing 19, respectively. The components and function of first motor assembly 16 and second motor assembly 18 are very similar to that of pump assemblies 40 and 42. However, as shown in FIG. 7 and as known in the art, instead of a swash plate assembly, each motor assembly 18 comprises a motor assembly thrust bearing 52 that is housed in a pocket (not shown) formed in each motor housing 17 and 19. Each thrust bearing 52 is held at a fixed angle so that each of the motor assemblies 16 and 18 has a fixed volume of fluid displacement when the motor cylinder blocks 48 and 49 are hydraulically driven by pump assemblies 40 and 42. Fixed displacement axial piston motors such as those illustrated are well known in the art and therefore will not be explained in greater detail. As mentioned previously, these motor assemblies could be configured to operate as continuously variable displacement motors (similar to the pumps) or as multi-speed motors (with more than one selectable fixed-displacement thrust bearing angle or position).

With motors installed, the motor housings 17 and 19 are attached to center section 64 via fasteners 77 so that motor cylinder blocks 48 and 49 are rotatably disposed on motor running surfaces 53 of center section 64. Hydraulic motor assemblies 16 and 18 may also each include a motor output shaft 15, which drives a reduction gear set 21 and an axle shaft 20, which may also be contained in or supported by motor housings 17 and 19, as shown in FIG. 7. In the embodiments shown herein, each reduction gear set 21 comprises a combination of spur gears and bevel gears such that the rotational axis of each motor shaft 15 is positioned perpendicular to the rotational axis of each axle shaft 20 in order to achieve a compact motor and gear set arrangement.

As shown in FIGS. 2 and 3, motor modules 22 and 24 may include brake assemblies 25a and 25b, respectively, which may be dynamic brakes or parking brakes. In the depicted embodiment, brake assemblies 25a and 25b comprise essentially the same construction, except brake actuation arm 23 is flipped 180 degrees (as illustrated) in brake assembly 25b, compared to brake assembly 25a. Brake assemblies 25a and 25b are mounted to motor housing covers 66 and 67, respectively, and interact with features formed on housing covers 66 and 67 to exert pressure on brake discs 81 when brake actuation arms 23 are actuated.

Figure 8:
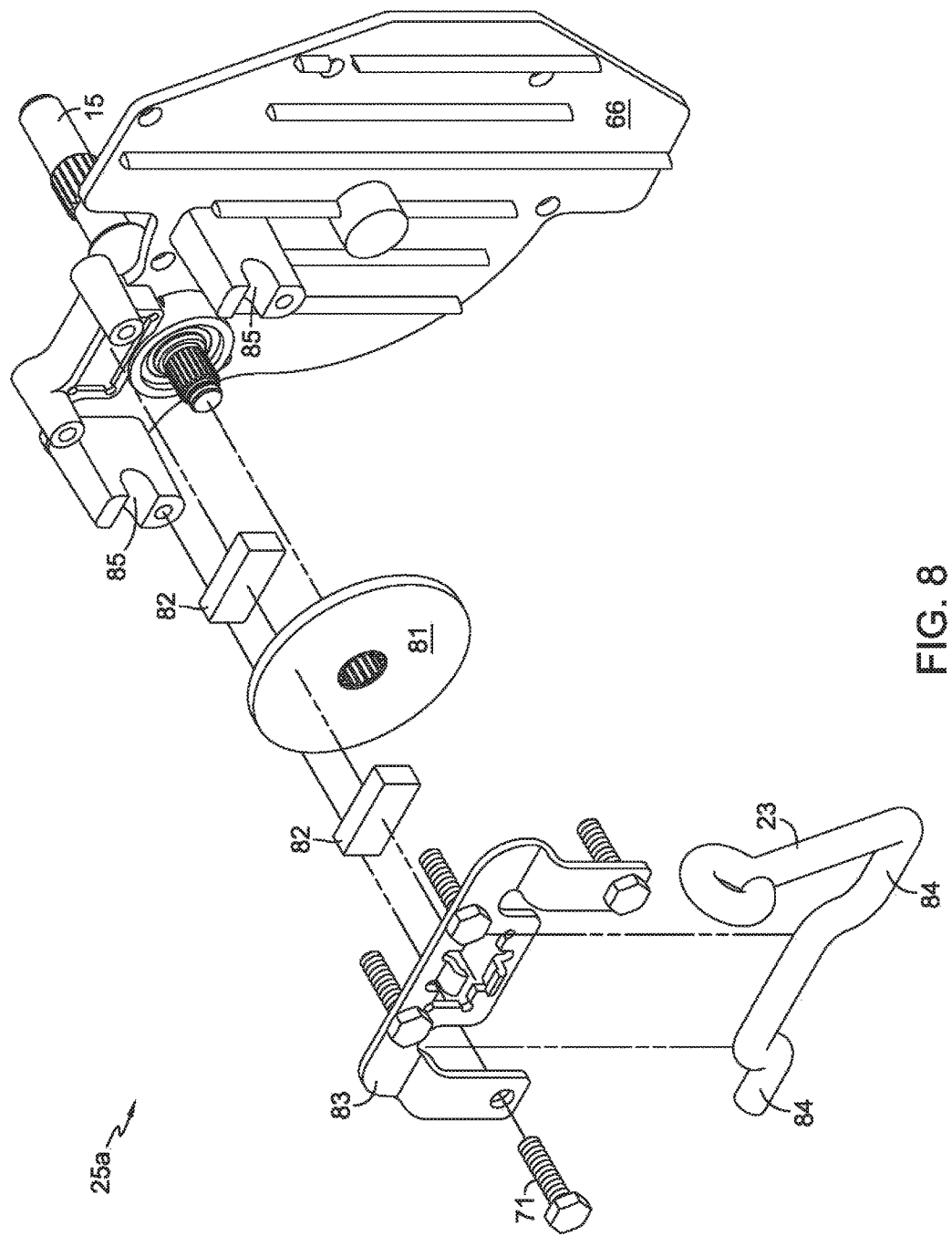
FIG. 8 is an exploded perspective view of the housing cover and brake assembly of the pump module shown in FIG. 1.

The construction of a brake assembly 25a is shown most clearly in FIGS. 5 and 8. Motor shaft 15 extends through cover 66, which is attached to motor housing 17 via fasteners 73. Brake disc 81 of brake assembly 25a is slidably mounted on and rotates with motor shaft 15. One brake puck 82 is nested in cover 66 on one side of disc 81, and another brake puck 82 is nested in bracket 83 on the opposite side of disc 81.

Brake actuation arm 23 is nested in cover 66, but retained by bracket 83 when brake assembly 25a is installed on cover 66 via fasteners 71. Specifically, trunnion portions 84 of brake actuation arm 23 are captured by and pivot within recesses 85 formed in cover 66. When brake actuation arm 23 is rotated toward cover 66, it engages and acts on one of the pair of brake pucks 82, which in turn acts on brake disc 81. Consequently, brake disc 81 is squeezed between pucks 82 to prevent, restrict or stop rotation of motor shaft 15.

Referring primarily to FIGS. 4 and 5, the assembly of transaxle assembly 14 into lower engine housing 32 will be described. The modular construction of transaxle assembly 14 enables a variety assembly sequence options. It will be appreciated by those in the art that the following assembly options are exemplary only, and are in no way limiting or exclusive.

One assembly sequence option of drive train assembly 10 consists of first attaching bridge plate 68 to lower engine housing 32 via fasteners 78 and then attaching a complete or substantially complete transaxle assembly 14 to lower engine housing 32 via fasteners 75. Gears 36 and 38 may then be attached to pump input shafts 44 and 45, respectively, followed by attachment of lower engine housing 32 to upper engine housing 31.

In another assembly sequence option of drive train assembly 10, bridge plate 68 is first attached to lower engine housing 32 via fasteners 78. Then, pump module 65, comprising pump assemblies 40 and 42, pump input shafts 44 and 45, swash plate assemblies 54, control shafts 60, other associated components, and center section 64 onto which these pump assemblies and other components are assembled, may be attached to lower engine housing 32 via fasteners 75. Gears 36 and 38 may then be attached to pump input shafts 44 and 45, respectively. The first motor module 22 and the second motor module 24, as shown in FIGS. 4-7, comprising first motor housing 17 and second motor housing 19, respectively; first motor assembly 16 and second motor assembly 18, respectively; reduction gear sets 21, axle shafts 20, and other associated components, may then be attached to center section 64, via fasteners 77, either before or after attachment of lower engine housing 32 to upper engine housing 31.

This configuration also allows for versatile serviceability. Optionally, either one or both of the motor modules 22 and 24 can be separately removed for servicing or the entire transaxle assembly 14 with lower engine housing 32 can be removed as a unit for servicing. In another embodiment (not shown), the axle support portion 27 of housings 17 and 19 may be removably attached to reduction gear set compartment 26 of housings 17 and 19 via fasteners, such as, for example, screws or bolts, in order to further enhance modularity and serviceability of the transaxle assembly.

Referring to FIGS. 4, 5 and 6, pump module 65 comprises a number of elements including center section 64, first pump assembly 40, second pump assembly 42, swash plate assemblies 54, swash plate control shafts 60, and swash plate slot guides 57. Bridge plate 68 is engaged to pump module 65, and comprises bearing supports 70 and 72, as well as support features 74 and 76. Support features 74 and 76 are sized to receive swash plate control shafts 60. When transaxle assembly 14 is fully assembled and installed, control shafts 60 are captured by, and pivot within, support features 74 and 76 and pivot supports 62, which may either be integrally formed on or attached to center section 64. A ball-end finger 61 extends from each control shaft 60 to engage a slot guide 57, which slides in a slot 63 formed on each swash plate body 56. When one swash plate control shaft 60 is rotated about its axis, the associated swash plate body 56 is thereby caused to pivot about its pivot axis, which is perpendicular to the axis of rotation of swash plate control shaft 60.

A central rib 56a is formed on each swash plate body 56 and interfaces with an arcuate slot (not shown) formed in bridge plate 68 to guide each swash plate body 56 as it pivots. Additionally, stops (not shown) may be formed on bridge plate 68 to limit the arcuate travel of swash plate bodies 56. Stop features also may be included on pivot supports 62 and control shafts 60 to limit rotation of control shafts 60.

Referring now to FIGS. 3, 5, 6, 9, 10 and 11, the fluid circuit will be described. Charge pump 80 is positioned in pocket 41 formed in lower engine housing 32, and is rotatably disposed on charge pump cover 69. As shown in FIG. 5, charge pump cover 69 includes a running surface for charge pump 80 and is integrally formed as part of center section 64. Optionally, charge pump cover 69 may be a separate cover for charge pump 80 that is attached to center section 64 via fasteners or other means. In the depicted embodiment, charge pump 80 is driven by cam shaft 35 of engine assembly 12. Charge pump 80 draws fluid from sump 13 of drive train assembly 10 and supplies fluid to the hydrostatic fluid circuit and, optionally, to other vehicle components for their lubrication. By way of example, such vehicle components may include those associated with the prime mover such as a crankshaft (discussed below), a valve head assembly, cams, and bushings (not shown) when appropriate means for distributing the fluid to such components are employed, e.g. a boss in the housings (not shown).

The pump compartment and the two motor compartments of sump 13 are fluidly connected by case drain passages 96, which include openings 95 to the motor portion of sump 13 and openings 97 to the pump portion of sump 13.

Charge pump 80 sends pressurized fluid through first passage 86 to filter 88. The pressurized fluid then flows through second passage 87 to charge inlet opening 89, then to charge passages 90 in charge manifold 91 of center section 64. Two charge inlet openings 89 are shown in center section 64, which allows versatility in placement of filter 88 on either side of lower engine housing 32. The unused opening 89 may be sealed, simply not formed, or utilized to direct fluid to other components of drive train assembly 10 requiring lubrication. Optionally, with modification to fluid passages in lower engine housing 32, a dual filtering system which utilizes both openings 89 may be employed in order to extend the service life of drive train assembly 10. Also, both openings 89 may be used in order to receive and direct a more balanced charging fluid flow to pumps and motors.

Figure 9:
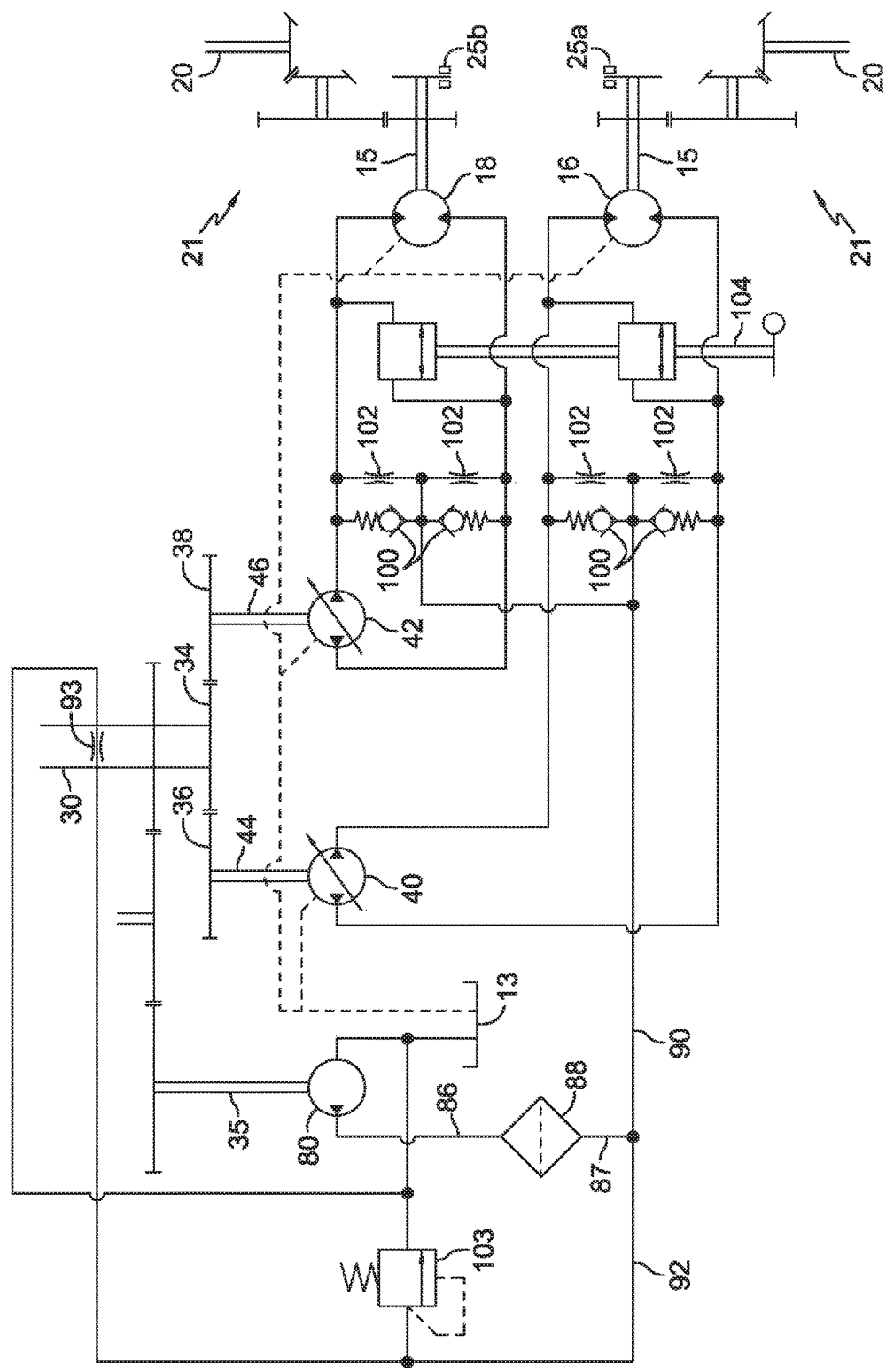
FIG. 9 is an exemplary schematic of certain features of the first and second embodiments of the present invention.

As shown schematically in FIG. 9, charge passages 90 of charge manifold 91 distribute pressurized fluid to check valve assemblies 100 and may also distribute fluid to one or more bleed orifices 102. Additionally, pressure relief valve 103 may be provided to direct excess pressurized fluid back to sump 13 or into the inlet of charge pump.

Charge passages 90 are also fluidly connected to annular crankshaft boss passage 92 formed in crankshaft support boss 94. The pressurized fluid in crankshaft boss passage 92 provides a fluid bearing for crankshaft 30, leaking through annular gap 93 (as shown in FIGS. 9 and 10) between crankshaft 30 and crankshaft support boss 94, returning to sump 13.

The fluid circuit shown in FIG. 9 may include additional features. For example, a bypass configuration 104 may be incorporated. Bypass configuration 104 may have two valves controlled by one actuator, as shown in FIG. 9, or two independently controlled valves.

Figure 10:
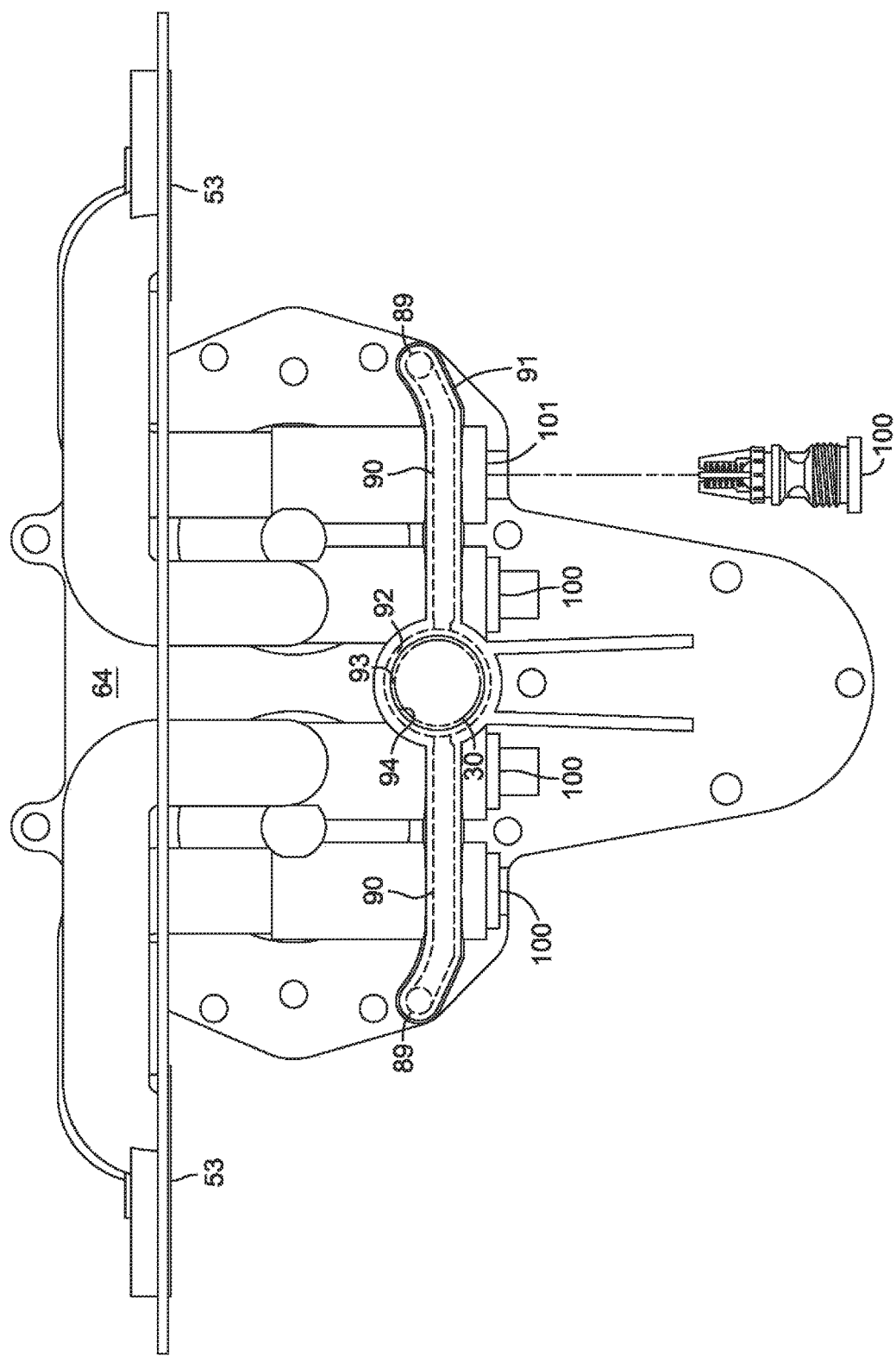
FIG. 10 is an exploded bottom plan view of the center section and a check valve assembly of the pump module shown in FIG. 1.
Figure 11:
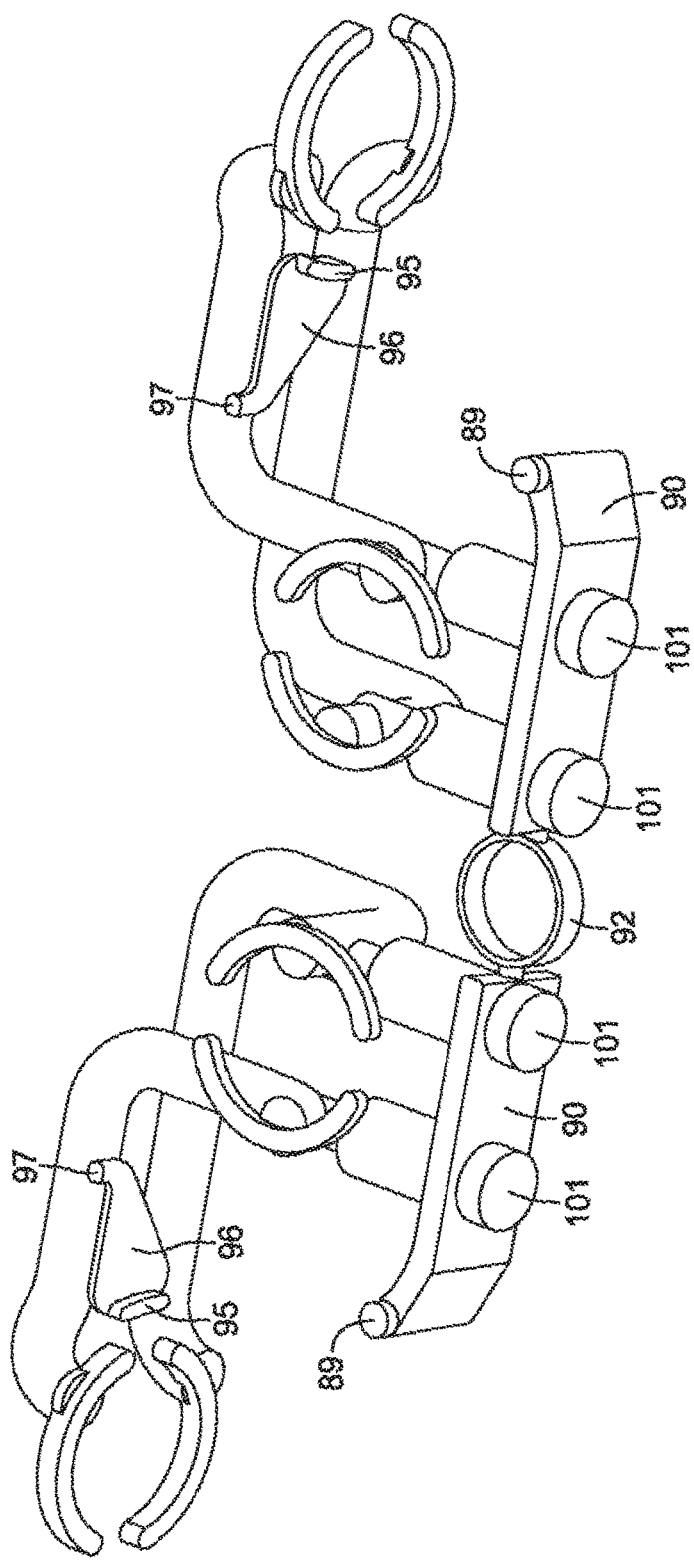
FIG. 11 is a top perspective view of certain fluid passages of the center section shown in FIG. 10.

FIG. 10 shows a bottom plan view of center section 64 and FIG. 11 shows a perspective view of the basic hydraulic fluid passages formed in center section 64, including an arrangement of the check valve porting contained therein. Center section 64 may include a plurality of ports and passages to house the elements previously described. For example, ports 101 may locate check valves 100. It will be appreciated by those in the art that check valves, such as check valves 100, are known in the art. As such, the scope of the present invention is not limited to the depicted check valves 100.

Figure 12:
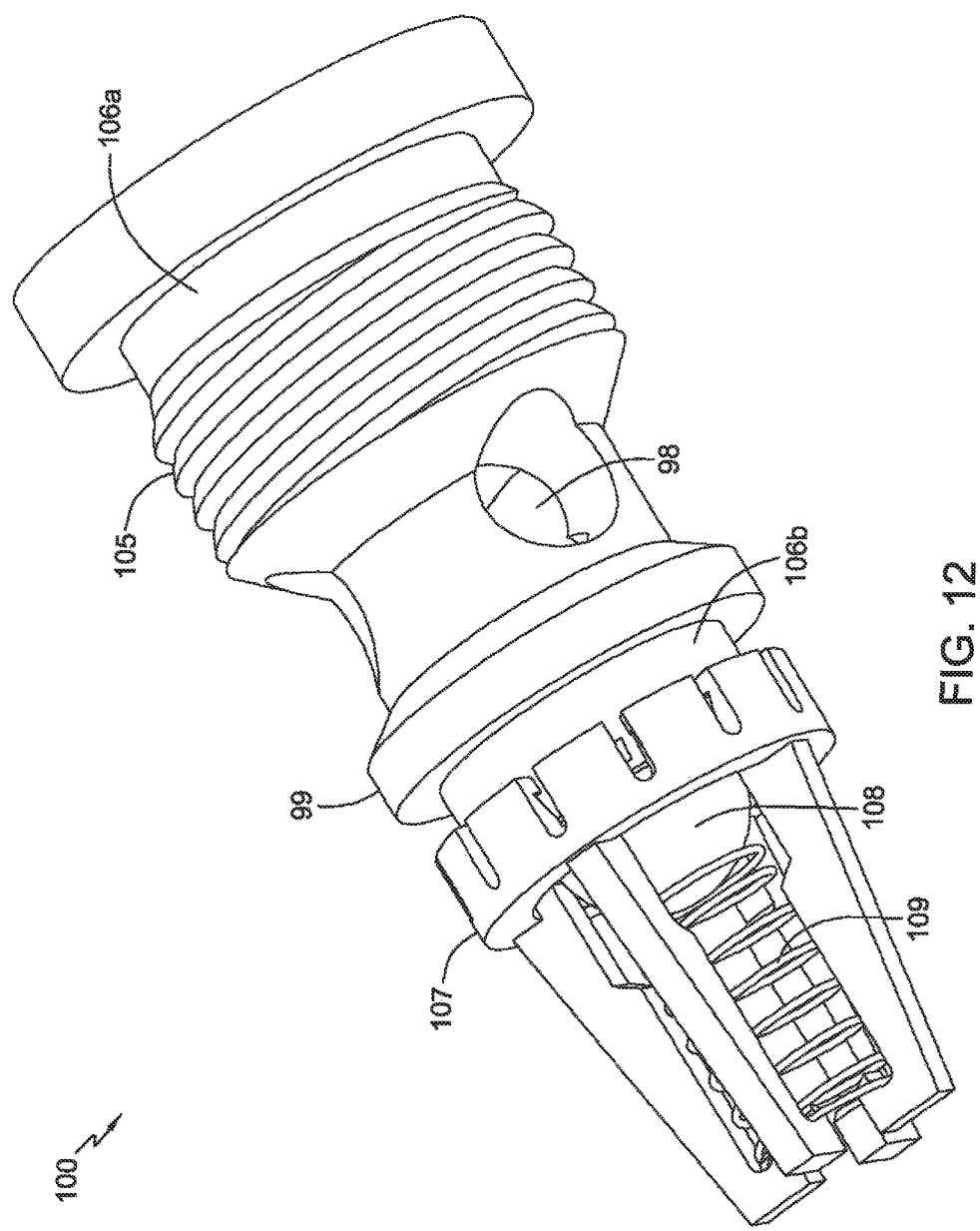
FIG. 12 is a perspective view of the check valve assembly shown in FIG. 10.

As shown in FIG. 12, check valves 100 include passages 98 through valve body 99. These passages are in fluid communication with pressurized fluid passages 90 of manifold 91. Check valves 100 include a snap-fit cage 107, which retains check ball 108 and check spring 109. O-ring grooves 106a and 106b are provided to prevent leakage and to direct fluid through passages 98 into the center cavity of valve body 99 and out through openings between the ribs of cage 107 when valve 100 is open. When fluid flow is reversed, valve 100 closes. Threaded portion 105 is provided for simple installation and servicing of valves 100.

Figure 13:
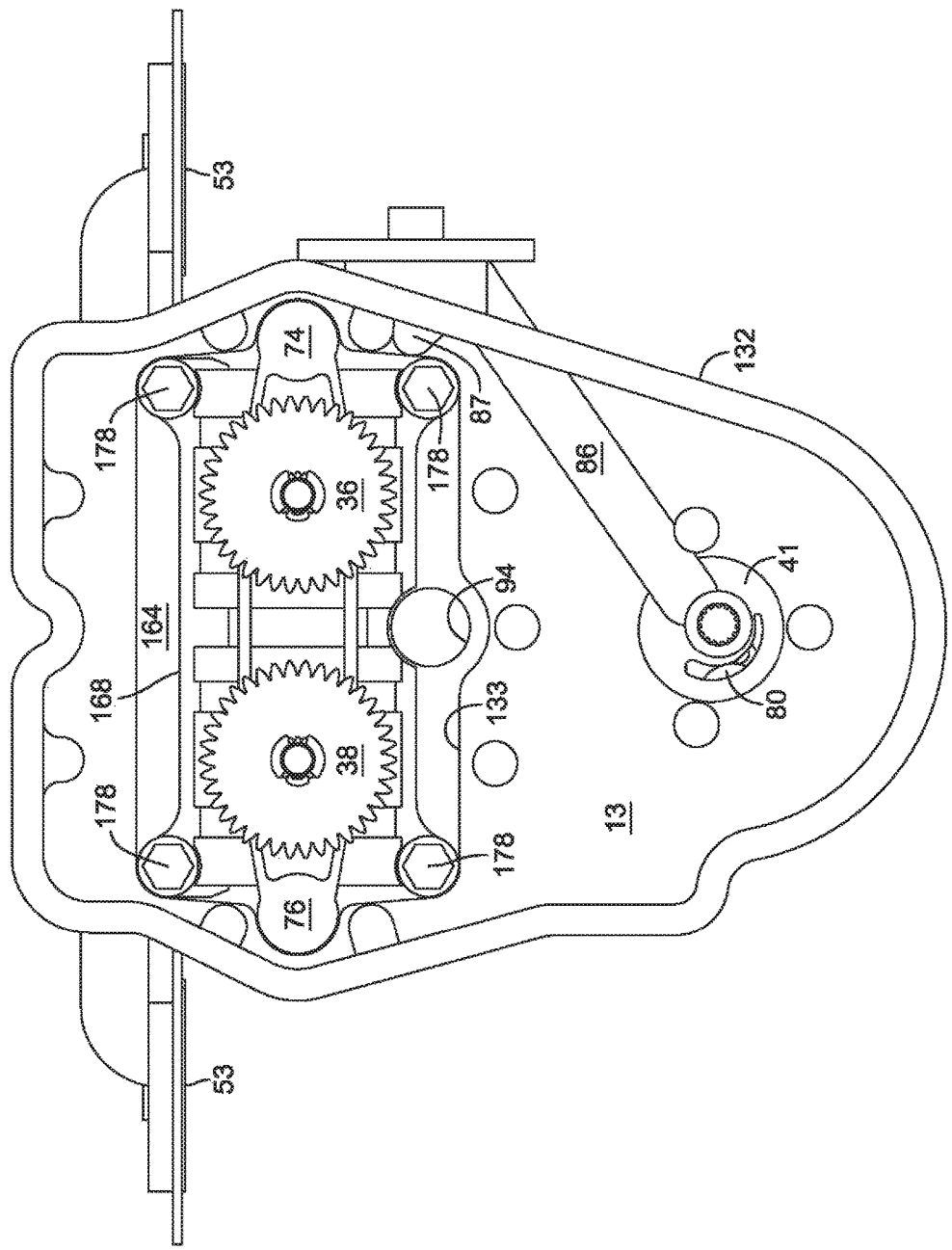
FIG. 13 is a top plan view of the pump module and lower engine housing of a second embodiment of the present invention.
Figure 14:
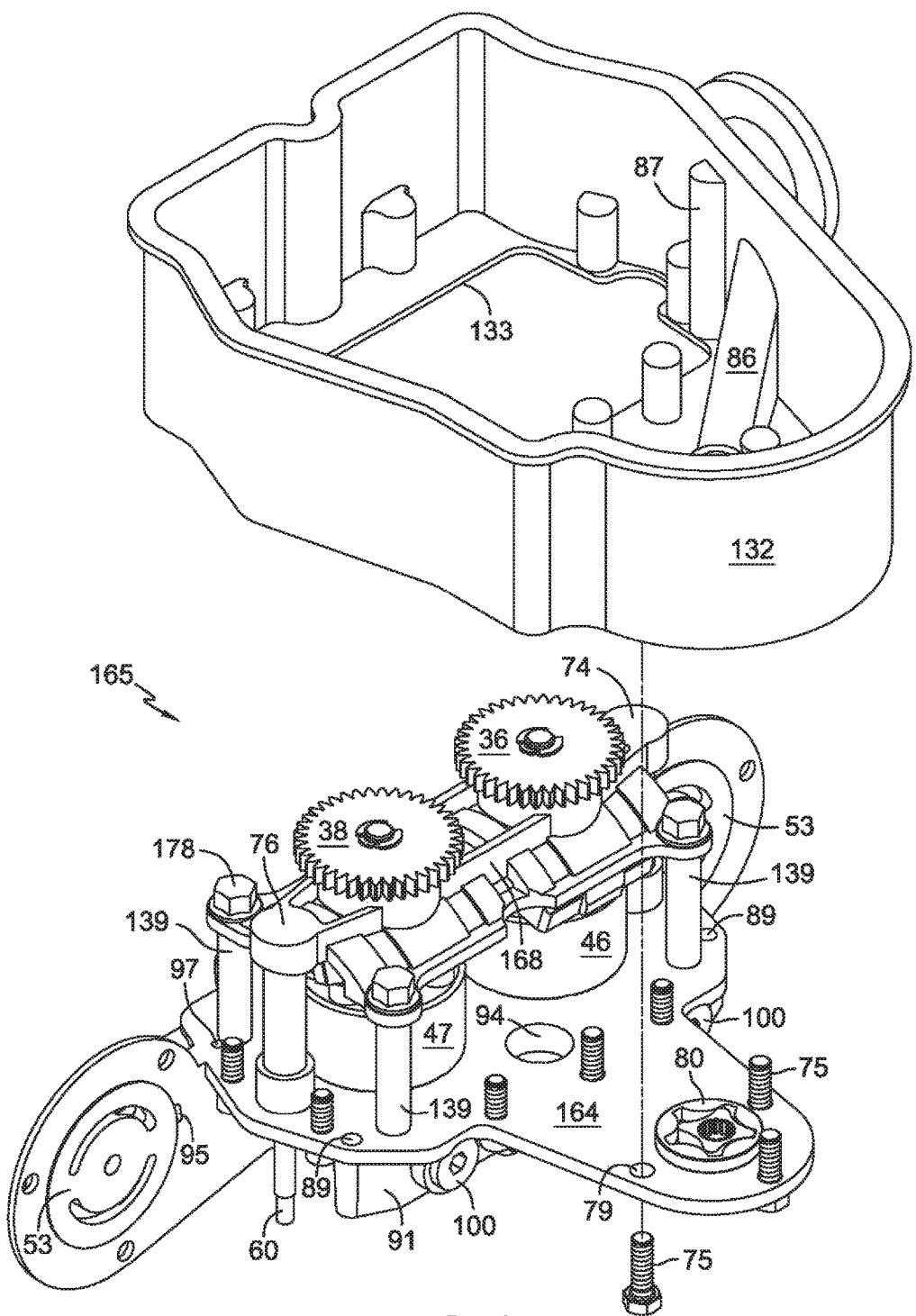
FIG. 14 is an exploded perspective view of the pump module and lower engine housing shown in FIG. 13.

A second embodiment of the present invention is illustrated in FIGS. 13 and 14. In this embodiment, fasteners 178 secure bridge 168 to posts 139, which may be engaged to or integrally formed on center section 164. This configuration enables complete assembly of pump module 165 prior to insertion of pumps through opening 133 of lower engine housing 132. As in the first embodiment, attachment of the center section to the lower engine housing seals opening 133. Sealant or gaskets (not shown) may be used to accomplish this sealing operation. In this second embodiment, pump module 165, complete with bridge plate, gears, etc., may be removed without removing the lower engine housing 132.

The various embodiments described above use crankshaft 30 to drive the pumps. However, it is anticipated that other shafts may be used to drive the pumps. For example, the cam shaft may also be used to drive the pumps, or additional shafts may be interposed between the crankshaft (or the cam shaft) and pump shafts to drive the pumps. The various embodiments also are described in terms of two pumps. However, a single pump could be used and a person of skill in the art could use the principles of the present invention to apply the present invention to three or more pumps.

While specific embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. A modular drive device, comprising:
an engine crankshaft disposed in an engine housing;
a plurality of gears disposed in the engine housing and driven by the engine crankshaft;
a center section attached to the engine housing and comprising a pump running surface, a motor running surface and hydraulic porting connecting the pump running surface to the motor running surface, wherein the pump running surface is located inside the engine housing and the motor running surface is located external to the engine housing and the hydraulic porting shares oil with the engine crankshaft and the plurality of gears;
a first pump located in the engine housing and rotatably disposed on the pump running surface, wherein the first pump comprises a first pump shaft offset from the engine crankshaft and driven by a first gear of the plurality of gears;
a motor housing engaged to the center section adjacent the motor running surface;
a first motor located in the motor housing and rotatably disposed on the motor running surface, wherein the first motor is located entirely outside the engine housing and is hydraulically connected to the first pump through the hydraulic porting; and
a first axle driven by the first motor and extending out from the motor housing.

2. The modular drive device of claim 1, wherein the motor housing is a first motor housing, and wherein the center section comprises a first pump running surface and a second pump running surface and a first motor running surface and a second motor running surface; and the modular drive device further comprises:
a second pump located in the engine housing and comprising a second pump shaft offset from the engine crankshaft and driven by a second gear of the plurality of gears;
a second motor housing engaged to the center section adjacent the second motor running surface;
a second motor located in the second motor housing and rotatably disposed on the second motor running surface, wherein the second motor is located entirely outside the engine housing and is hydraulically connected to the second pump by the hydraulic porting; and
a second axle driven by the second motor and extending out of the second motor housing.

3. The modular drive device of claim 2, further comprising a filter disposed on an external surface of the engine housing.

4. The modular drive device of claim 3, wherein the center section comprises a first flat surface wherein the first pump running surface and the second pump running surface are both formed on the first flat surface.

5. The modular drive device of claim 4, wherein a charge pump is also located on the first flat surface and driven by the engine crankshaft.

6. The modular drive device of claim 4, wherein:
the first pump further comprises a first pump cylinder block engaged to and driven by the first pump shaft and having a first plurality of pump pistons disposed therein, a first swash plate engaged to the first plurality of pump pistons for controlling the output of the first pump, and a first swash plate control shaft extending through the first flat surface of the center section, wherein the first swash plate control shaft is engaged to and is capable of rotating the first swash plate; and
the second pump further comprises a second pump cylinder block engaged to and driven by the second pump shaft and having a second plurality of pump pistons disposed therein, and a second swash plate engaged to the second plurality of pump pistons for controlling the output of the second pump; and a second swash plate control shaft extending through the first flat surface of the center section, wherein the second swash plate control shaft is engaged to and is capable of rotating the second swash plate.

7. The modular drive device of claim 6, wherein the center section further comprises a second flat surface on which the first motor running surface is formed, and a third flat surface on which the second motor running surface is formed, wherein the second and third flat surfaces are on the same plane, and perpendicular to the first flat surface.

8. The modular drive device of claim 7, further comprising:
a first reduction gear train disposed in the first motor housing, wherein the first motor housing is separately attached to and supported by the center section at a first end thereof;
a second reduction gear train disposed in the second motor housing, wherein the first motor housing and the second motor housing is separately attached to and supported by the center section at opposite ends thereof.

9. The modular drive device of claim 8, further comprising a brace secured to both the first motor housing and the second motor housing.

10. The modular drive device of claim 8, wherein the first motor housing further comprises a first axle support portion extending outwardly therefrom, in which the first axle is supported, and the second motor housing further comprises a second axle support portion extending outwardly therefrom, in which the second axle is supported.

11. The modular drive device of claim 4, wherein the first flat surface of the center section is engaged to and seals an opening formed in the engine housing.

12. The modular drive device of claim 2, further comprising a bridge plate mounted inside the engine housing, wherein the first pump and the second pump are disposed on one side of the bridge plate, and the first gear and the second gear are located on a second side of the bridge plate, opposite to the first side.

13. A modular drive device, comprising:
an engine crankshaft disposed in an engine housing;
a plurality of gears disposed in the engine housing and driven by the engine crankshaft;
a center section attached to the engine housing and comprising:
a first flat surface on which a first pump running surface and a second pump running surface are formed;
a second flat surface located adjacent one side of the first flat surface, and a first motor running surface formed on the second flat surface;
a third flat surface generally coplanar with the second flat surface and located adjacent a second side of the first flat surface, opposite to the first side, and a second motor running surface formed on the third flat surface; and
hydraulic porting connecting the first pump running surface to the first motor running surface and the second pump running surface to the second motor running surface, wherein the first and second pump running surfaces are located inside the engine housing and the first and second motor running surfaces are located external to the engine housing and the hydraulic porting shares oil with the engine crankshaft and the plurality of gears;
a first pump located in the engine housing and rotatably disposed on the first pump running surface, wherein the first pump comprises a first pump shaft driven by a first gear of the plurality of gears;
a second pump located in the engine housing and comprising a second pump shaft located in the engine housing and driven by a second gear of the plurality of gears; and
a first motor housing separately attached to and supported by the center section at a first end thereof;
a second motor housing separately attached to and supported by the center section at a second end thereof, opposite the first end;
a first motor located in the first motor housing and rotatably disposed on the first motor running surface, wherein the first motor is located entirely outside the engine housing and is hydraulically connected to the first pump through the hydraulic porting;
a second motor located in the second motor housing and rotatably disposed on the second motor running surface, wherein the second motor is located entirely outside the engine housing and hydraulically connected to the second pump through the hydraulic porting;
a first reduction gear train disposed in the first motor housing and driven by the first motor, and a first axle engaged to and driven by the first reduction gear train; and
a second reduction gear train disposed in the second motor housing and driven by the second motor, and a second axle engaged to and driven by the second reduction gear train.

14. The modular drive device of claim 13, further comprising a brace secured to both the first motor housing and the second motor housing.

15. The modular drive device of claim 13, wherein the first motor housing further comprises a first axle support portion extending outwardly therefrom for supporting the first axle, and the second motor housing further comprises a second axle support portion extending outwardly therefrom for supporting the second axle.

16. The modular drive device of claim 13, wherein a charge pump is also located on the first flat surface and driven by the engine crankshaft.

17. The modular drive device of claim 16, further comprising a filter disposed on an external surface of the engine housing and hydraulically connected to the charge pump.

18. The modular drive device of claim 13, wherein the first flat surface of the center section is engaged to and seals an opening formed in the engine housing.

19. The modular drive device of claim 13, wherein:
the first pump further comprises a first pump cylinder block engaged to and driven by the first pump shaft and having a first plurality of pump pistons disposed therein, a first swash plate engaged to the first plurality of pump pistons for controlling the output of the first pump, and a first swash plate control shaft extending through the first flat surface of the center section, wherein the first swash plate control shaft is engaged to and is capable of rotating the first swash plate; and
the second pump further comprises a second pump cylinder block engaged to and driven by the second pump shaft and having a second plurality of pump pistons disposed therein, and a second swash plate engaged to the second plurality of pump pistons for controlling the output of the second pump; and a second swash plate control shaft extending through the first flat surface of the center section, wherein the second swash plate control shaft is engaged to and is capable of rotating the second swash plate.

20. A modular drive device, comprising:
a plurality of driven gears disposed in an engine housing;

a center section attached to the engine housing and comprising:
  a first flat surface on which a first pump running surface and a second pump running surface are formed, wherein the first and second pump running surfaces are located inside the engine housing;
  a second flat surface located adjacent one side of the first flat surface, and a first motor running surface formed on the second flat surface;
  a third flat surface generally coplanar with the second flat surface and located adjacent a second side of the first flat surface, opposite to the first side, and a second motor running surface formed on the third flat surface, wherein the first and second motor running surfaces are located external to the engine housing;
a charge pump located on the first flat surface;
hydraulic porting formed in the center section and connecting the first pump running surface to the first motor running surface and the second pump running surface to the second motor running surface, wherein a portion of the hydraulic porting is located in a manifold structure located on a fourth surface of the center section opposite and below the first flat surface;
a filter disposed on one side of the engine housing and connected to the charge pump, and the filter is connected to an inlet opening in the manifold structure;
a first pump rotatably disposed on the first pump running surface and a second pump rotatably disposed on the second pump running surface, wherein the first pump and the second pump are both located in the engine housing;
a first motor rotatably disposed on the first motor running surface, wherein the first motor is located entirely outside the engine housing;
a second motor rotatably disposed on the second motor running surface, wherein the second motor is located entirely outside the engine housing; and
a first axle driven by the first motor and a second axle driven by the second motor.

* * * * *